US010883389B2

(12) United States Patent
Kubota

(10) Patent No.: US 10,883,389 B2
(45) Date of Patent: Jan. 5, 2021

(54) COMBINED CYCLE PLANT, METHOD FOR REDUCING MINIMUM OUTPUT THEREOF, AND CONTROL DEVICE THEREFOR

(71) Applicant: Mitsubishi Hitachi Power Systems, Ltd., Kanagawa (JP)

(72) Inventor: Atsushi Kubota, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 177 days.

(21) Appl. No.: 16/076,567

(22) PCT Filed: Sep. 27, 2016

(86) PCT No.: PCT/JP2016/078394
§ 371 (c)(1),
(2) Date: Aug. 8, 2018

(87) PCT Pub. No.: WO2017/145427
PCT Pub. Date: Aug. 31, 2017

(65) Prior Publication Data
US 2019/0040766 A1 Feb. 7, 2019

(30) Foreign Application Priority Data
Feb. 25, 2016 (JP) .................. 2016-034230

(51) Int. Cl.
*F01K 23/10* (2006.01)
*F02C 9/28* (2006.01)
(Continued)

(52) U.S. Cl.
CPC ............... *F01K 23/10* (2013.01); *F02C 9/28* (2013.01); *F22B 1/18* (2013.01); *F22B 1/1815* (2013.01);
(Continued)

(58) Field of Classification Search
CPC ...... F01K 23/10; F01K 23/101; F01K 23/106; F01K 23/108; F02C 6/18; F02C 9/26;
(Continued)

(56) References Cited

U.S. PATENT DOCUMENTS 3,640,250 A * 2/1972 Costello .................... F22G 5/12
122/406.5
3,973,391 A * 8/1976 Reed ..................... F01K 23/105
60/794
(Continued)

FOREIGN PATENT DOCUMENTS

JP          62-262617      11/1987
JP          8-260911       10/1996

OTHER PUBLICATIONS

International Search Report dated Dec. 27, 2016 in International Application No. PCT/JP2016/078394, with English translation.
(Continued)

*Primary Examiner* — Alain Chau
(74) *Attorney, Agent, or Firm* — Wenderoth, Lind & Ponack, L.L.P.

(57) ABSTRACT

A control device includes a reception unit configured to receive a load schedule indicating a load in the future of a combined cycle plant, a steam temperature control unit configured to control a temperature of steam flowing into a steam turbine, and a fuel control unit configured to control a flow rate of fuel supplied to a gas turbine. The steam temperature control unit is configured to output a command indicating an amount of operation for decreasing the temperature of the steam to a steam temperature regulator prior to a load decrease time at which the load is to be decreased in the load schedule.

18 Claims, 5 Drawing Sheets

(51) Int. Cl.
*F22G 5/12* (2006.01)
*F22B 1/18* (2006.01)

(52) U.S. Cl.
CPC .......... *F22G 5/12* (2013.01); *F05D 2270/303* (2013.01); *Y02E 20/16* (2013.01)

(58) Field of Classification Search
CPC .. F02C 9/28; F22B 1/18; F22B 1/1807; F22B 1/1815; F05D 2270/303; F05D 2270/72; F05D 2270/74; Y02E 20/16; F22G 5/12
See application file for complete search history.

(56) References Cited

U.S. PATENT DOCUMENTS

| | | | | |
|---|---|---|---|---|
| 4,013,877 A | * | 3/1977 | Uram | F01K 23/108 700/6 |
| 4,028,884 A | * | 6/1977 | Martz | F01K 23/108 60/39.182 |
| 4,031,404 A | * | 6/1977 | Martz | F01K 23/108 290/40 R |
| 4,047,005 A | * | 9/1977 | Heiser | F22B 35/008 700/288 |
| 4,791,889 A | * | 12/1988 | Matsko | F22G 5/12 122/479.1 |
| 6,339,926 B1 | * | 1/2002 | Ichiro | F01K 23/108 60/39.182 |
| 10,267,185 B2 | * | 4/2019 | Jordan, Jr. | F01K 23/101 |
| 2014/0150438 A1 | * | 6/2014 | Ellis | F02C 9/263 60/772 |
| 2014/0260177 A1 | | 9/2014 | Reed | |
| 2015/0247464 A1 | | 9/2015 | Pandey et al. | |
| 2015/0275703 A1 | | 10/2015 | Thompson et al. | |
| 2016/0146060 A1 | * | 5/2016 | Gobrecht | F01K 7/24 60/774 |
| 2017/0030228 A1 | * | 2/2017 | Jordan, Jr. | F01K 23/101 |

OTHER PUBLICATIONS

Written Opinion of the International Searching Authority dated Dec. 27, 2016 in International Application No. PCT/JP2016/078394, with English translation.

* cited by examiner

COMBINED CYCLE PLANT, METHOD FOR REDUCING MINIMUM OUTPUT THEREOF, AND CONTROL DEVICE THEREFOR

CROSS-REFERENCE TO RELATED APPLICATION

Priority is claimed from Japanese Patent Application No. 2016-034230, filed Feb. 25, 2016, the content of which is incorporated herein by reference.

TECHNICAL FIELD

The invention relates to a combined cycle plant, a method for reducing a minimum output thereof, and a control device therefor.

BACKGROUND ART

A combined cycle plant includes a gas turbine that is driven by combustion gas, an exhaust heat recovery boiler that generates steam using heat of the combustion gas discharged from the gas turbine, and a steam turbine that is driven by steam.

Japanese Unexamined Patent Application, First Publication No. S62-262617 discloses a thermal power plant including a boiler that generates steam, a steam turbine that is driven by steam, and a power generator that generates electric power by driving the steam turbine. In such a thermal power plant, various operation units of the thermal power plant are operated such that the output of the power generator changes in accordance with a power generation schedule (a load schedule) from the outside.

TECHNICAL PROBLEM

Enlargement of an operating output range (a load range) is required for the combined cycle plant. Accordingly, it is preferable that a minimum output (a minimum load) be reduced as much as possible when the output of the combined cycle plant is reduced.

SUMMARY OF INVENTION

An objective of the invention is to provide a combined cycle plant that can reduce an operating minimum output when the output of the combined cycle plant is reduced, a method for reducing a minimum output thereof, and a control device therefor.

A method for reducing a minimum output of a combined cycle plant according to a first aspect of the invention for achieving the above-mentioned objective is a method for reducing a minimum output of a combined cycle plant including a gas turbine that is driven using combustion gas, an exhaust heat recovery boiler that generates steam using heat of exhaust gas discharged from the gas turbine, and a steam turbine that is driven using the steam, the method including: a reception step of receiving a load schedule indicating a load of the combined cycle plant; a decrease time-setting step of recognizing a load decrease time at which the load is to be decreased with reference to the load schedule received in the reception step and setting a time prior to the load decrease time as a temperature decrease time at which a temperature of the steam supplied to the steam turbine is to be decreased; a temperature-decreasing step of decreasing the temperature of the steam supplied to the steam turbine at the temperature decrease time; and a gas turbine output-decreasing step of decreasing an amount of fuel supplied to the gas turbine at the load decrease time.

When the temperature of steam which is supplied to the steam turbine decreases rapidly, a thermal stress generated in a turbine rotor or the like of the steam turbine increases and a lifespan of the turbine rotor or the like decreases. Accordingly, a temperature decrease rate which is a decrease per unit time of the steam temperature is determined in operating the steam turbine. It is preferable for a user who receives the plant output that a time from the time of start of a decrease in plant output to a time at which the plant output becomes a target output be short. Accordingly, an operating minimum output when the plant output is decreased is determined to be a predetermined output from the above-mentioned points of view.

In the method for reducing a minimum output, when the plant output is decreased, the steam temperature decreases before a gas turbine output decreases. Accordingly, in the method for reducing a minimum output, in comparison with a case in which the steam temperature does not decrease before the gas turbine output decreases, it is possible to lower the steam temperature even when the temperature decrease rate of steam is the same. Accordingly, in the method for reducing a minimum output, it is possible to set the operating minimum output of the plant to be lower than the operating minimum output in the case in which a main steam temperature does not decrease before the gas turbine output decreases.

A method for reducing a minimum output of a combined cycle plant according to a second aspect of the invention for achieving the above-mentioned objective is the method for reducing a minimum output of a combined cycle plant according to the first aspect, wherein the decrease time-setting step includes setting a time prior to the load decrease time by a predetermined fixed time as the temperature decrease time.

A method for reducing a minimum output of a combined cycle plant according to a third aspect of the invention for achieving the above-mentioned objective is the method for reducing a minimum output of a combined cycle plant according to the first aspect, wherein the decrease time-setting step includes setting a time prior to the load decrease time by a time corresponding to a decrease in load indicated by the load schedule as the temperature decrease time.

A method for reducing a minimum output of a combined cycle plant according to a fourth aspect of the invention for achieving the above-mentioned objective is the method for reducing a minimum output of a combined cycle plant according to any one of the first to third aspects, wherein the temperature-decreasing step includes decreasing the temperature of the steam such that a rate of change which is a change per unit time of the temperature of the steam is within a predetermined range.

As described above, the temperature decrease rate of steam which is supplied to the steam turbine is determined in operation of the steam turbine. In the method for reducing a minimum output, the temperature decrease rate of steam in the temperature-decreasing step is set to be equal to or less than the temperature decrease rate in operation. As a result, in the method for reducing a minimum output, it is possible to lengthen the lifespan of the turbine rotor or the like.

A method for reducing a minimum output of a combined cycle plant according to a fifth aspect of the invention for achieving the above-mentioned objective is the method for reducing a minimum output of a combined cycle plant according to any one of the first to fourth aspects, wherein the temperature-decreasing step includes spraying water into the steam.

A method for reducing a minimum output of a combined cycle plant according to a sixth aspect of the invention for achieving the above-mentioned objective is the method for reducing a minimum output of a combined cycle plant according to the fifth aspect, wherein the temperature-decreasing step includes slowly decreasing an amount of water sprayed with the elapse of time.

In the method for reducing a minimum output, it is possible to prevent the output of the steam turbine from decreasing more than necessary due to an excessive decrease in the temperature of the steam supplied to the steam turbine.

A control device for a combined cycle plant according to a seventh aspect of the invention for achieving the above-mentioned objective is a control device for a combined cycle plant including a gas turbine that is driven using combustion gas, a fuel regulator that regulates a flow rate of fuel supplied to the gas turbine, an exhaust heat recovery boiler that generates steam using heat of exhaust gas discharged from the gas turbine, a steam turbine that is driven using the steam, and a steam temperature regulator that regulates a temperature of the steam, the control device including: a reception unit that receives a load schedule indicating a load of the combined cycle plant; a steam temperature control unit that outputs a command indicating an amount of operation for decreasing the temperature of the steam to the steam temperature regulator prior to a load decrease time at which the load is to be decreased in the load schedule; and a fuel control unit that outputs a command indicating an amount of operation for reducing an amount of fuel supplied at the load decrease time to the fuel regulator.

With the control device, it is possible to lower the operating minimum output of the plant like the above-mentioned method for reducing a minimum output.

A control device for a combined cycle plant according to an eighth aspect of the invention for achieving the above-mentioned objective is the control device for a combined cycle plant according to the seventh aspect further including a temperature decrease time-instructing unit that recognizes the load decrease time at which the load is to be decreased from the load schedule received by the reception unit, sets a time prior to the load decrease time as a temperature decrease time at which the temperature of the steam is to be decreased, and causes the steam temperature control unit to output the command to the steam temperature regulator at the temperature decrease time.

A control device for a combined cycle plant according to a ninth aspect of the invention for achieving the above-mentioned objective is the control device for a combined cycle plant according to the eighth aspect, wherein the temperature decrease time-instructing unit stores a predetermined time and sets a time prior to the load decrease time by the predetermined time as the temperature decrease time.

A control device for a combined cycle plant according to a tenth aspect of the invention for achieving the above-mentioned objective is the control device for a combined cycle plant according to the eighth aspect, wherein the temperature decrease time-instructing unit stores a relationship between a decrease in load and a lead time, sets the lead time corresponding to the decrease in load indicated by the load schedule using the relationship, and sets a time prior to the load decrease time by the lead time as the temperature decrease time.

A control device for a combined cycle plant according to an eleventh aspect of the invention for achieving the above-mentioned objective is the control device for a combined cycle plant according to any one of the eighth to tenth aspects, wherein the steam temperature control unit sets an amount of operation of the steam temperature regulator such that a rate of change which is a change per unit time of the temperature of the steam is within a predetermined range.

A control device for a combined cycle plant according to a twelfth aspect of the invention for achieving the above-mentioned objective is the control device for a combined cycle plant according to any one of the eighth to eleventh aspects, wherein the steam temperature control unit slowly decreases an amount of operation of the steam temperature regulator with the elapse of time.

A control device for a combined cycle plant according to a thirteenth aspect of the invention for achieving the above-mentioned objective is the control device for a combined cycle plant according to the seventh aspect, further including: an output unit that outputs the load schedule received by the reception unit; and an operation terminal that issues an instruction for the amount of operation of the steam temperature regulator to the steam temperature control unit.

A combined cycle plant according to a fourteenth aspect of the invention for achieving the above-mentioned objective is a combined cycle plant including: the control device according to any one of the seventh to thirteenth aspects; the gas turbine; the fuel regulator; the exhaust heat recovery boiler; the steam turbine; and the steam temperature regulator.

A combined cycle plant according to a fifteenth aspect of the invention for achieving the above-mentioned objective is the combined cycle plant according to the fourteenth aspect, further including a steam line in which the steam supplied to the steam turbine flows, wherein the steam temperature regulator includes a nozzle that sprays water into the steam line and a spray water regulator that regulates a flow rate of water supplied to the nozzle.

A combined cycle plant according to a sixteenth aspect of the invention for achieving the above-mentioned objective is the combined cycle plant according to the fifteenth aspect, wherein the exhaust heat recovery boiler includes a plurality of overheaters that overheat steam, the plurality of overheaters are connected to each other via steam lines, and the nozzle is provided in one steam line from a steam line connecting the plurality of overheaters to each other or a steam line connecting an overheater located furthest downstream in a steam flow to the steam turbine.

A combined cycle plant according to a seventeenth aspect of the invention for achieving the above-mentioned objective is the combined cycle plant according to the sixteenth aspect, wherein the nozzle is provided in a steam line connecting a furthest downstream overheater located furthest downstream in the steam flow among the plurality of overheaters to a second furthest downstream overheater located upstream from the furthest downstream overheater in the steam flow.

ADVANTAGEOUS EFFECTS OF INVENTION

According to an aspect of the invention, it is possible to reduce an operating minimum output when the output of a combined cycle plant is reduced.

DESCRIPTION OF EMBODIMENTS

Hereinafter, various embodiments of a combined cycle plant according to the invention will be described in detail with reference to the accompanying drawings.

First Embodiment

A first embodiment of the combined cycle plant according to the invention will be described below with reference to FIGS. 1 to 4.

Figure 1:
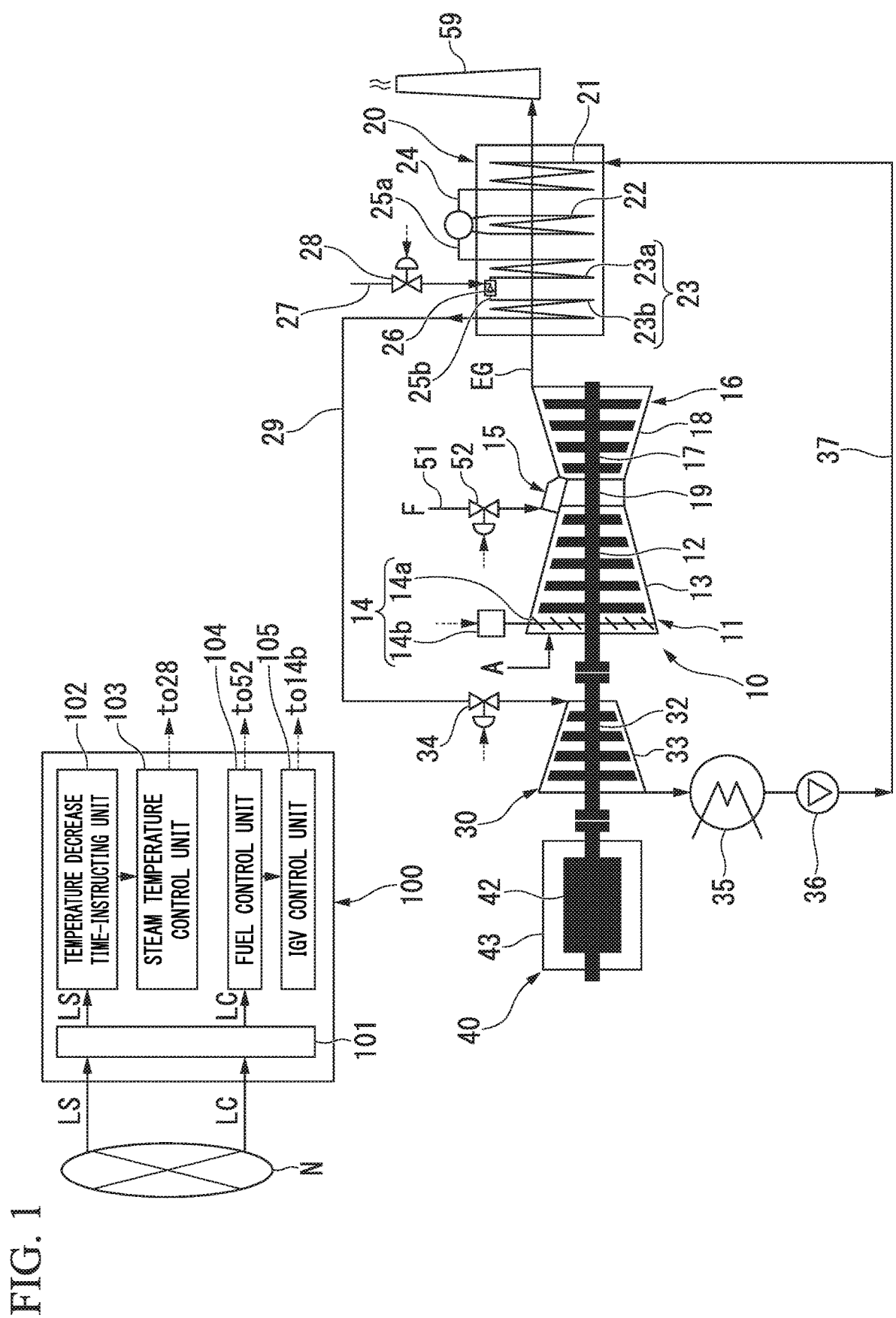
FIG. 1 is a system diagram of a combined cycle plant according to a first embodiment of the invention.

As illustrated in FIG. 1, the combined cycle plant according to this embodiment includes a gas turbine 10, an exhaust heat recovery boiler 20 that generates steam using heat of exhaust gas discharged from the gas turbine 10, a steam turbine 30 that is driven using steam from the exhaust heat recovery boiler 20, a power generator 40 that generates electric power by driving the turbines 10 and 30, a condenser 35 that returns steam discharged from the steam turbine 30 to water, a water feed pump 36 that feeds water from the condenser 35 to the exhaust heat recovery boiler 20, and a control device 100 that controls these elements.

The gas turbine 10 includes a compressor 11 that compresses outside air A to generate compressed air, a combustor 15 that combusts fuel F in the compressed air to generate combustion gas of a high temperature, and a turbine 16 that is driven using the combustion gas.

The compressor 11 includes a compressor rotor 12 that rotates about an axis, a compressor casing 13 that covers the compressor rotor 12, and an intake air regulator 14 that regulates an amount of intake air from the outside air A. The intake air regulator 14 includes an inlet guide vane (IGV) 14a that is disposed in an intake port of the compressor casing 13 and a driver 14b that drives the IGV 14a such that an opening degree of the IGV 14a is adjusted.

A fuel line 51 that supplies fuel F from a fuel supply source to the combustor 15 is connected to the combustor 15. A fuel-regulating valve (a fuel regulator) 52 that regulates a flow rate of fuel F flowing into the combustor 15 is provided in the fuel line 51.

The turbine 16 includes a turbine rotor 17 that rotates about an axis with the combustion gas from the combustor 15 and a turbine casing 18 that covers the turbine rotor 17. The turbine rotor 17 and the compressor rotor 12 rotate integrally about the same axis. The turbine rotor 17 and the compressor rotor 12 are connected to each other to form a gas turbine rotor 19. An exhaust port of the turbine 16 is connected to the exhaust heat recovery boiler 20. Accordingly, exhaust gas EG discharged from the turbine 16 is guided to the exhaust heat recovery boiler 20.

The exhaust heat recovery boiler 20 includes a coal economizer 21 that heats water, an evaporator 22 that evaporates water heated by the coal economizer 21 to steam, and an overheater 23 that overheats the steam generated from the evaporator 22. The overheater 23 includes a first overheater 23a and a second overheater 23b. The second overheater (a furthest downstream overheater) 23b, the first overheater (a second furthest downstream overheater) 23a, the evaporator 22, and the coal economizer 21 are sequentially arranged toward downstream in a flow of exhaust gas EG flowing from the turbine 16 to a chimney 59. The coal economizer 21 and the evaporator 22 are connected to each other via a heated water line 24. The evaporator 22 and the first overheater 23a are connected to each other via a first steam line 25a. The first overheater 23a and the second overheater 23b are connected to each other via a second steam line 25b. A nozzle 26 that sprays water into the second steam line 25b is provided in the second steam line 25b. A spray water line 27 is connected to the nozzle 26. A spray water-regulating valve 28 is provided in the spray water line 27. A main steam line 29 that guides overheated steam to the steam turbine 30 is connected to the second overheater 23b. In this embodiment, a steam temperature regulator is constituted by the nozzle 26 and the spray water-regulating valve 28.

The steam turbine 30 includes a turbine rotor 32 and a turbine casing 33 that covers the turbine rotor 32. The main steam line 29 is connected to the turbine casing 33. A main steam valve 34 that causes steam to flow into the steam turbine 30 is provided in the main steam line 29.

The condenser 35 is provided at a steam outlet of the steam turbine 30. The condenser 35 and the coal economizer 21 of the exhaust heat recovery boiler 20 are connected to each other via a water supply line 37. The water feed pump 36 is provided in the water supply line 37. The spray water line 27 is connected to, for example, an ejection side of the water feed pump 36.

The power generator 40 includes a power generator rotor 42 that rotates about an axis and a power generator casing 43 that covers the power generator rotor 42.

The gas turbine rotor 19, the steam turbine rotor 32, and the power generator rotor 42 are arranged on the same axis, are connected to each other, and rotate integrally. Accordingly, a combined cycle plant according to this embodiment is a single-axis type combined cycle plant. The combined cycle plant according to this embodiment is a single-axis type, but the invention is not limited thereto. For example, the gas turbine rotor 19 and the steam turbine rotor 32 may not be connected to each other. Specifically, a multi-axis type in which the gas turbine rotor 19 and a rotor of a first power generator are connected to each other and the steam turbine rotor 32 and a rotor of a second power generator are connected to each other may be employed.

The control device 100 includes a reception unit 101 that receives information from the outside, a steam temperature control unit 103 that controls a temperature of main steam flowing into the steam turbine 30, a temperature decrease time-instructing unit 102 that instructs a time at which the temperature of the main steam is to be decreased to the steam temperature control unit 103, a fuel control unit 104 that controls a flow rate of fuel, and an IGV control unit 105 that controls an amount of intake air of the gas turbine 10.

The reception unit 101 receives a load command LC and a load schedule LS from the outside via a communication network N. The load command LC is a command indicating a power load required at the current time, that is, a command indicating a plant output required at the current time. The load schedule LS indicates a power load required at times in the future. The plant output is an output obtained by summing a gas turbine output and a steam turbine output. In other words, the plant output is a power generator output. The load command LC and the load schedule LS are sent from, for example, a power supply company via the communication network N. The reception unit 101 also receives measurement signals from meters which are provided in various devices of the combined cycle plant in addition to the load command LC and the like.

The fuel control unit 104 determines a flow rate of fuel supplied to the combustor 15 such that a plant output corresponding to a load indicated by the load command LC can be generated. The fuel control unit 104 outputs a valve opening degree command (a command indicating an amount of operation) corresponding to the flow rate of fuel to a fuel-regulating valve 52.

The IGV control unit 105 determines an IGV opening degree at which an amount of intake air corresponding to the flow rate of fuel determined by the fuel control unit 104 is obtained. The IGV control unit 105 outputs an IGV opening degree command indicating the IGV opening degree to the driver 14b of the intake air regulator 14. The IGV control unit 105 includes a map or the like indicating a relationship between the flow rate of fuel ($\propto$ gas turbine output) and the IGV opening degree. The IGV control unit 105 determines the IGV opening degree corresponding to the flow rate of fuel ($\propto$ gas turbine output) with reference to the map or the like. The map or the like indicates, for example, a fixed minimum opening degree in a range of the gas turbine output of 0% to 50% and an opening degree increasing with an increase in the gas turbine output in a range of the gas turbine output equal to or greater than 50%. That is, when the gas turbine output is, for example, 50% or greater, change of the IGV opening degree has a positive correlation with change of the flow rate of fuel ($\propto$ gas turbine output).

The temperature decrease time-instructing unit 102 recognizes a load decrease time at which the load is to be decreased with reference to the load schedule LS received by the reception unit 101. The temperature decrease time-instructing unit 102 sets a time prior to the load decrease time as a temperature decrease time at which the temperature of main steam supplied to the steam turbine 30 is to be decreased. The temperature decrease time-instructing unit 102 stores, for example, a predetermined time in advance and sets a time prior to the load decrease time by the predetermined time as the temperature decrease time. The temperature decrease time-instructing unit 102 instructs the steam temperature control unit 103 to decrease the temperature of the main steam at the temperature decrease time.

The steam temperature control unit 103 executes a temperature difference decrease mode and an output decrease mode. In the steam turbine 30, when a temperature difference between the temperature of main steam flowing into the steam turbine 30 and the temperature of a member such as the turbine rotor of the steam turbine 30 is large, a thermal stress is generated in the turbine rotor or the like and the lifespan of the turbine rotor or the like is reduced. Accordingly, at the time of starting of the steam turbine 30 or the like, it is preferable that the temperature of main steam be decreased when the temperature of main steam is higher than the temperature of the turbine rotor or the like and the temperature difference therebetween is large. The steam temperature control unit 103 executes the temperature difference decrease mode at the time of starting of the steam turbine 30 or the like. In the temperature difference decrease mode, the steam temperature control unit 103 sets the valve opening degree of the spray water-regulating valve 28 depending on the temperature difference when the temperature of main steam is higher than the temperature of the turbine rotor or the like and the temperature difference therebetween is larger than a predetermined value. The steam temperature control unit 103 executes the output decrease mode when a time at which the temperature of main steam is to be decreased is instructed by the temperature decrease time-instructing unit 102. In the output decrease mode, the steam temperature control unit 103 sets the valve opening degree of the spray water-regulating valve 28 in accordance with a predetermined rule. In any mode, the steam temperature control unit 103 outputs a valve opening degree command (a command indicating an amount of operation) indicating the valve opening degree determined by itself to the spray water-regulating valve 28. The steam temperature control unit 103 stores, for example, a fixed valve opening degree in the output decrease mode. The steam temperature control unit 103 stores an opening degree changing rule with the elapse of time after the output decrease mode has been executed. Accordingly, in the output decrease mode, the steam temperature control unit 103 outputs a valve opening degree command indicating the fixed valve opening degree to the spray water-regulating valve 28 and then outputs a valve opening degree command indicating the valve opening degree based on the opening degree changing rule.

The operation of the combined cycle plant will be described below with reference to the flowchart illustrated in FIG. 2.

The reception unit 101 of the control device 100 frequently receives the load schedule LS from the outside (S1: a load schedule receiving step). The temperature decrease time-instructing unit 102 recognizes the load decrease time at which the load is to be decreased with reference to the load schedule LS received by the reception unit 101 as described above. As illustrated in (a) and (b) of FIG. 3, the temperature decrease time-instructing unit 102 sets a time t0 prior to the load decrease time t1 by a predetermined time ΔT stored therein as the temperature decrease time (S2: a temperature decrease time-setting step).

When the temperature decrease time t0 is set, the temperature decrease time-instructing unit 102 instructs the steam temperature control unit 103 to decrease the temperature of main steam at the temperature decrease time t0. When this instruction is received, the steam temperature control unit 103 executes the output decrease mode. In the output decrease mode, the steam temperature control unit 103 sets the valve opening degree of the spray water-regulating valve 28 in accordance with a predetermined rule. Then, the steam temperature control unit 103 outputs a valve opening degree command (a command indicating an amount of operation) indicating the valve opening degree to the spray water-regulating valve 28 at the temperature decrease time t0. Accordingly, the valve opening degree of the spray water-regulating valve 28 becomes the valve opening degree indicated by the valve opening degree command, and water is sprayed into the second steam line 25b via the spray water line 27 and the nozzle 26 (S3: a steam temperature-decreasing step). As a result, as illustrated in (b) of FIG. 3, spraying of water into the second steam line 25b is started at the temperature decrease time t0.

As described above, the opening degree of the spray water-regulating valve 28 at the temperature decrease time t0 is, for example, a predetermined fixed valve opening degree. The steam temperature control unit 103 estimates a time t3 at which the plant output becomes a target output, that is, an output corresponding to the load indicated by the load command LC, for example, on the basis of the load decrease time t1 indicated by the load schedule LS. The steam temperature control unit 103 slowly decreases the valve opening degree indicated by the valve opening degree command with the elapse of time from the temperature decrease time t0 such that the amount of water sprayed becomes zero at the time t3. Accordingly, the amount of water sprayed into the second steam line 25b decreases slowly from the temperature decrease time t0 and substantially becomes zero at the time t3 at which the plant output becomes the target output as illustrated in (b) of FIG. 3.

Figure 3:
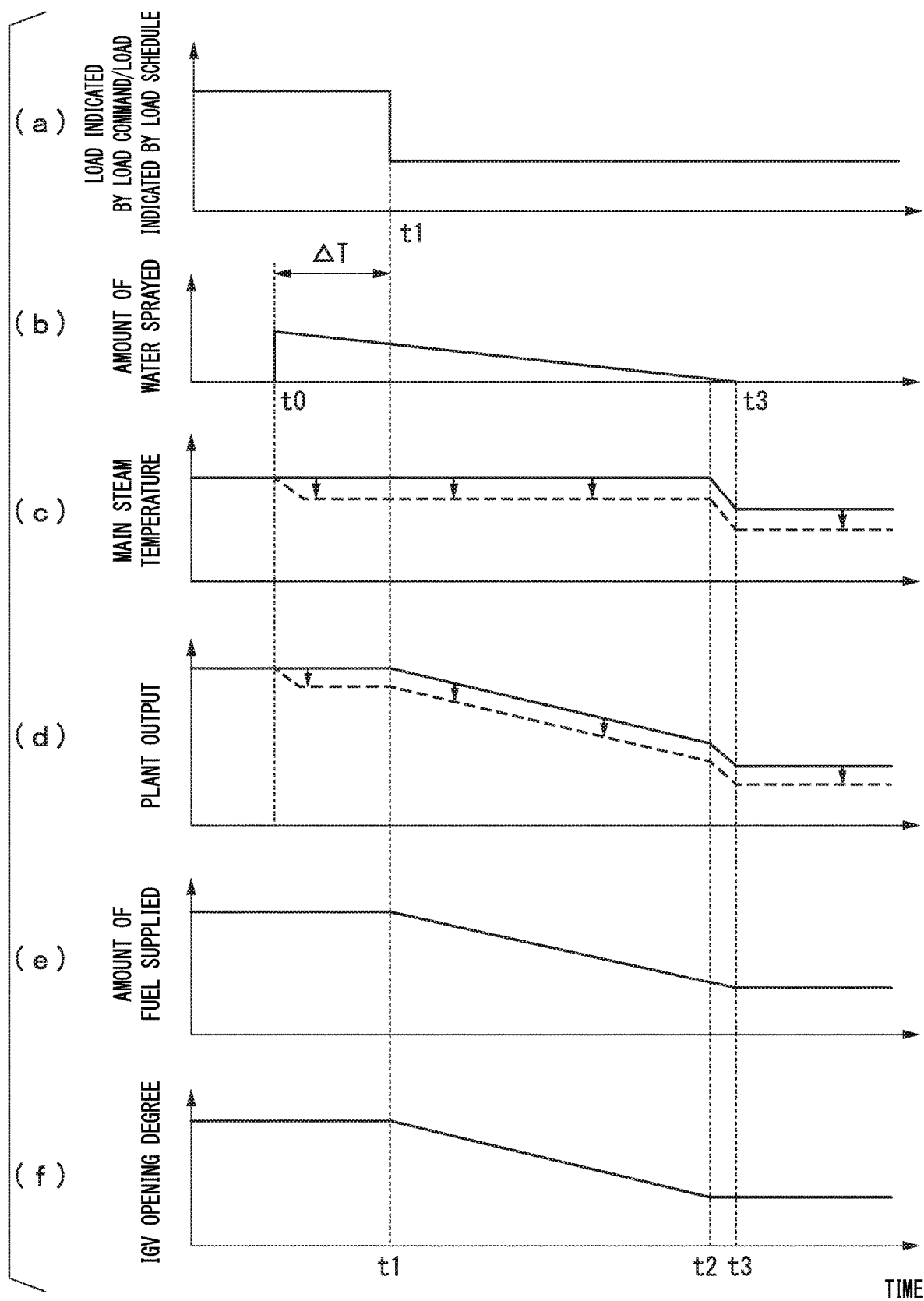
FIG. 3 is a diagram illustrating changes of various parameters with the elapse of time according to the first embodiment of the invention, where (a) of FIG. 3 is a graph illustrating change of a load indicated by a load command or a load schedule with the elapse of time, (b) of FIG. 3 is a graph illustrating change of an amount of water injected with the elapse of time, (c) of FIG. 3 is a graph illustrating change of a main steam temperature with the elapse of time, (d) of FIG. 3 is a graph illustrating change of a plant output with the elapse of time, (e) of FIG. 3 is a graph illustrating change of a fuel flow rate with the elapse of time, and (f) of FIG. 3 is a graph illustrating change of an IGV opening degree with the elapse of time.

As indicated by a dotted line in (c) of FIG. 3, when water is sprayed into the second steam line 25b (t0), the temperature of overheated steam flowing in the second steam line 25b decreases and thus the temperature of main steam flowing into the steam turbine 30 also decreases. Accordingly, the steam turbine output decreases and the plant output decreases even when the gas turbine output is constant as indicated by a dotted line in (d) of FIG. 3.

When the temperature of main steam decreases rapidly, a thermal stress generated in the turbine rotor or the like of the steam turbine 30 increases and the lifespan of the turbine rotor or the like decreases. Accordingly, a temperature decrease rate which is a decrease per unit time of the temperature of main steam is determined in operation of the steam turbine 30. In this embodiment, for example, the fixed valve opening degree of the spray water-regulating valve 28 at the temperature decrease time t0 is determined such that the temperature decrease rate when the temperature of main steam decreases by spraying water into the second steam line 25b is not greater than the temperature decrease rate determined in operation. In this embodiment, in order to prevent an excessive decrease in the temperature of main steam and a larger decrease in the output of the steam turbine 30 than necessary, the amount of sprayed water is slowly decreased with the elapse of time.

Thereafter, the reception unit 101 of the control device 100 receives a load command LC indicating a decrease in load at a load decrease time t1 indicated by the load schedule LS from the outside (S4: a load command receiving step). The fuel control unit 104 sets a flow rate of fuel supplied to the combustor 15 on the basis of the load command LC. The fuel control unit 104 outputs a valve opening degree command (a command indicating an amount of operation) corresponding to the flow rate of fuel to the fuel-regulating valve 52. When the gas turbine output is decreased, an output decrease rate with the elapse of time is determined in advance. Accordingly, when the load command LC indicating a decrease in load is received from the reception unit 101, the fuel control unit 104 outputs a valve opening degree command for causing the valve opening degree to decrease slowly with the elapse of time at a constant rate to the fuel-regulating valve 52 (S5: a gas turbine output-decreasing step).

As a result, the flow rate of fuel supplied to the combustor 15 decreases slowly at a constant rate from the load decrease time t1 as illustrated in (e) of FIG. 3.

The flow rate of fuel set by the fuel control unit 104 is input to the IGV control unit 105. The IGV control unit 105 sets an IGV opening degree corresponding to the flow rate of fuel with reference to the map or the like as described above. The IGV control unit 105 outputs an IGV opening degree command indicating the IGV opening degree to the driver 14b of the intake air regulator 14. As described above, the change of the IGV opening degree determined using the map or the like has a positive correlation with change of the flow rate of fuel ($\propto$ the gas turbine output), for example, when the gas turbine output is equal to or greater than 50%. Accordingly, for example, when the gas turbine output is equal to or greater than 50% and the flow rate of fuel decreases slowly from the load decrease time t1 as illustrated in (f) of FIG. 3, the IGV opening degree decreases slowly therewith.

When the IGV opening degree decreases, the amount of intake air of the gas turbine 10 decreases. Accordingly, since the amount of intake air decreases with the decrease in the flow rate of fuel, the temperature of exhaust gas EG discharged from the gas turbine 10 is maintained substantially constant even when the flow rate of fuel decreases. The change of the temperature of main steam has a high positive correlation with the change of the temperature of the exhaust gas EG Accordingly, the temperature of main steam is basically constant even when the flow rate of fuel decreases as illustrated in (c) of FIG. 3.

For example, when the gas turbine output becomes 50% at a time t2 subsequent to the load decrease time t1, the IGV opening degree is maintained at a minimum IGV opening degree even when the gas turbine output further decreases as illustrated in (f) of FIG. 3. Accordingly, even after the time t2, the temperature of the exhaust gas EG discharged from the gas turbine 10 decreases with the decrease in the flow rate of fuel when the flow rate of fuel decreases. Accordingly, as illustrated in (e) and (c) of FIG. 3, even after the time t2, the temperature of main steam decreases with the decrease in the flow rate of fuel similarly to the temperature of the exhaust gas EG when the flow rate of fuel decreases.

Before the time t2, the gas turbine output decreases with the decrease in the flow rate of fuel but the temperature of main steam is substantially constant, and thus the steam turbine output is substantially constant. On the other hand, after the time t2, the gas turbine output decreases with the decrease in the flow rate of fuel and the steam turbine output also decreases with the decrease in the temperature of main steam. Accordingly, the rate of decrease of the plant output is greater after the time t2 than before the time t2 as illustrated in (d) of FIG. 3.

As illustrated in (e) and (d) of FIG. 3, when the flow rate of fuel becomes at a target flow rate, the plant output becomes the target output (t3). As described above, when the plant output becomes the target output (t3), the amount of water sprayed into the second steam line 25b becomes substantially zero as illustrated in (b) of FIG. 3. As illustrated in (c) of FIG. 3, the temperature of main steam also becomes constant.

The control device 100 according to this embodiment receives a load command LC from the outside via the communication network N. Accordingly, even when the load command LC indicating a decrease in load is transmitted from the outside at the load decrease time indicated by the previously transmitted load schedule LS, it cannot be said that the control device 100 receives the load command LC at a time which perfectly matches the load decrease time indicated by the load schedule LS depending on the state of the communication network N or the like. Therefore, when a load command LC indicating a decrease in load has been received within a range of several seconds from the load decrease time indicated by the load schedule LS, the control device 100 according to this embodiment is considered to receive the load command LC indicating the decrease in load indicated by the load schedule LS. On the other hand, when a load command LC indicating a decrease in load has not been received within a range of several seconds from the load decrease time indicated by the load schedule LS, the control device 100 according to this embodiment determines that the load schedule LS has changed. In this case, the control device 100 stops spraying of water into the second steam line 25b unless the later received load schedule LS predetermines a decrease in load, for example, within several tens of seconds from the load decrease time indicated by the previously received load schedule LS.

Figure 4:
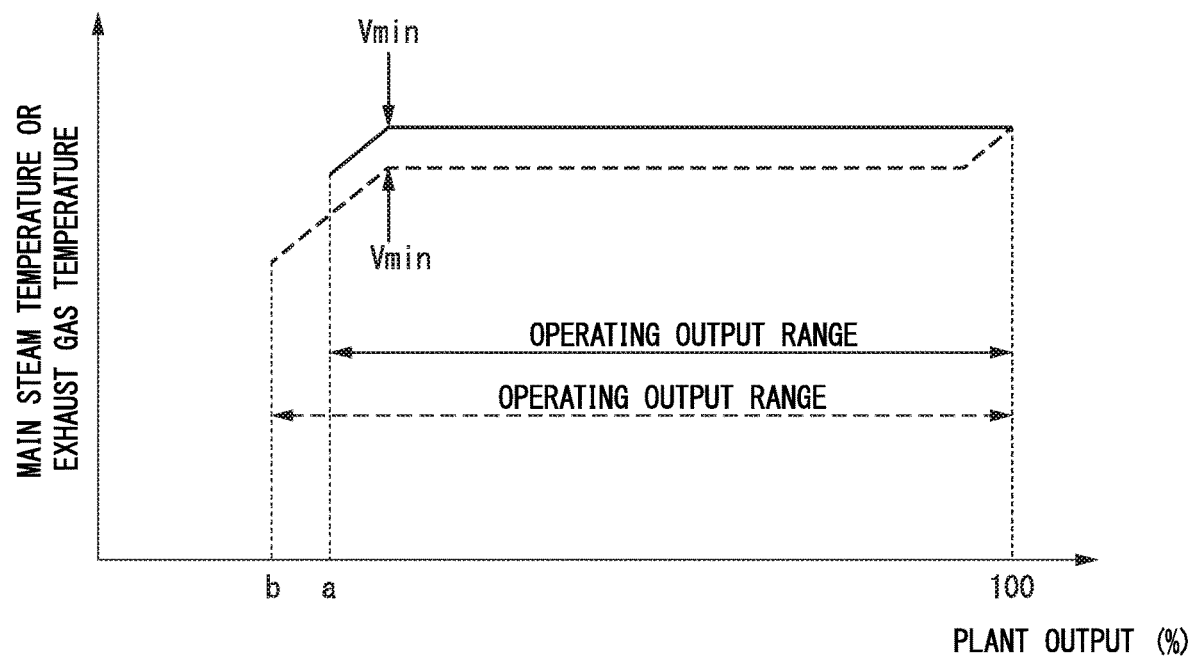
FIG. 4 is a graph illustrating a relationship between a plant output and a main steam temperature or an exhaust gas temperature according to the first embodiment of the invention.

A relationship between the plant output and the temperature of main steam will be described now with reference to FIG. 4. In FIG. 4, a dotted line represents a case in which water is sprayed into the second steam line 25b from a time t0 prior to a load decrease time t1, and a solid line represents a case in which water is not sprayed into the second steam line 25b.

In order to enhance plant efficiency, the combined cycle plant is operated such that the temperature of main steam is basically constant even when the plant output changes. Specifically, for example, when the plant output is decreased from a state in which the plant output is 100%, the flow rate of fuel is decreased, the IGV opening degree is decreased to decrease the amount of intake air, and the temperature of main steam is maintained constant as described above. However, when the IGV opening degree becomes a minimum opening degree, the amount of intake air does not decrease even when the flow rate of fuel decreases. That is, after the IGV opening degree becomes the minimum opening degree, the ratio of the amount of intake air to the flow rate of fuel increases. Accordingly, as indicated by the solid line in FIG. 4, after the IGV opening degree becomes the minimum opening degree Vmin, the temperature of exhaust gas and the temperature of main steam decrease at a constant rate with the decrease in the flow rate of fuel at a constant rate.

As described above, the temperature decrease rate which is a decrease per unit time of the temperature of main steam, is determined in operation of the steam turbine 30. It is preferable for a user who receives the plant output that a time from the time of start of a decrease in plant output to a time at which the plant output becomes a target output be short. Accordingly, the operating minimum output when the plant output is decreased is determined as a predetermined output from the above-mentioned points of view. It is assumed that the operating minimum output of the plant when water is not sprayed into the second steam line 25b is a %.

In this embodiment, when the plant output is decreased from the state in which the plant output is 100%, water is sprayed into the second steam line 25b from the time t0 prior to the load decrease time t1 as indicated by the dotted line in FIG. 4 and thus the temperature of main steam decreases from the time t0 prior to the load decrease time t1. Accordingly, in this embodiment, the temperature of main steam in a state in which the plant output is close to 100% is lower, in comparison with a case in which water is not sprayed into the second steam line 25b. Thereafter, the plant output decreases with the decrease in the flow rate of fuel at a constant rate. Until the IGV opening degree becomes the minimum opening degree Vmin, the temperature of main steam is maintained almost constant even when the plant output decreases. In this embodiment, after the IGV opening degree becomes the minimum opening degree Vmin, the temperature of exhaust gas and the temperature of main steam decrease at a constant rate with the decrease in the flow rate of fuel at a constant rate.

In this embodiment, the plant output when the IGV opening degree becomes the minimum opening degree Vmin is lower than that in a case in which water is not sprayed into the second steam line 25b (the solid line). For example, it is assumed that the IGV opening degree becomes the minimum opening degree Vmin when the gas turbine output becomes 50%. In this embodiment, the temperature of main steam is decreased before the gas turbine output is decreased. Accordingly, in this embodiment, the steam turbine output and the plant output decrease before the gas turbine output decreases. Accordingly, in this embodiment in comparison with a case in which the temperature of main steam is not decreased, the plant output is lower even when the gas turbine output is the same. Accordingly, in this embodiment, the plant output when the gas turbine output becomes 50%, that is, when the IGV opening degree becomes the minimum opening degree Vmin, is lower than that in a case in which the temperature of main steam is not decreased.

In this embodiment, when the plant output is decreased, the temperature of main steam is decreased before the gas turbine output is decreased. Accordingly, in this embodiment, in comparison with a case in which the temperature of main steam is not decreased before the gas turbine output is decreased, the temperature of main steam can be set to be lower even when the temperature decrease rate of main steam is the same. Accordingly, the operating minimum output of the plant in this embodiment is b %, which is lower than a %, in the case in which the temperature of main steam is not decreased before the gas turbine output is decreased. That is, in this embodiment, it is possible to enlarge a decrease in the plant output when the plant output is decreased. In other words, in this embodiment, it is possible to widen the operating output range (the operating load range).

As a method of decreasing the operating minimum output of the plant, a method of decreasing the temperature of main steam by decreasing the flow rate of fuel and reducing a decrease in the amount of intake air more than the decrease in the flow rate of fuel before a scheduled load decrease time t1 can be conceivable. In this method, the gas turbine output decreases along with the steam turbine output before the scheduled load decrease time t1. On the other hand, in this embodiment, the steam turbine output decreases but the gas turbine output does not decrease before the scheduled load decrease time t1. Accordingly, in this embodiment, a decrease in the plant output before the scheduled load decrease time t1 can be set to be less than that in the method.

Second Embodiment

Figure 5:
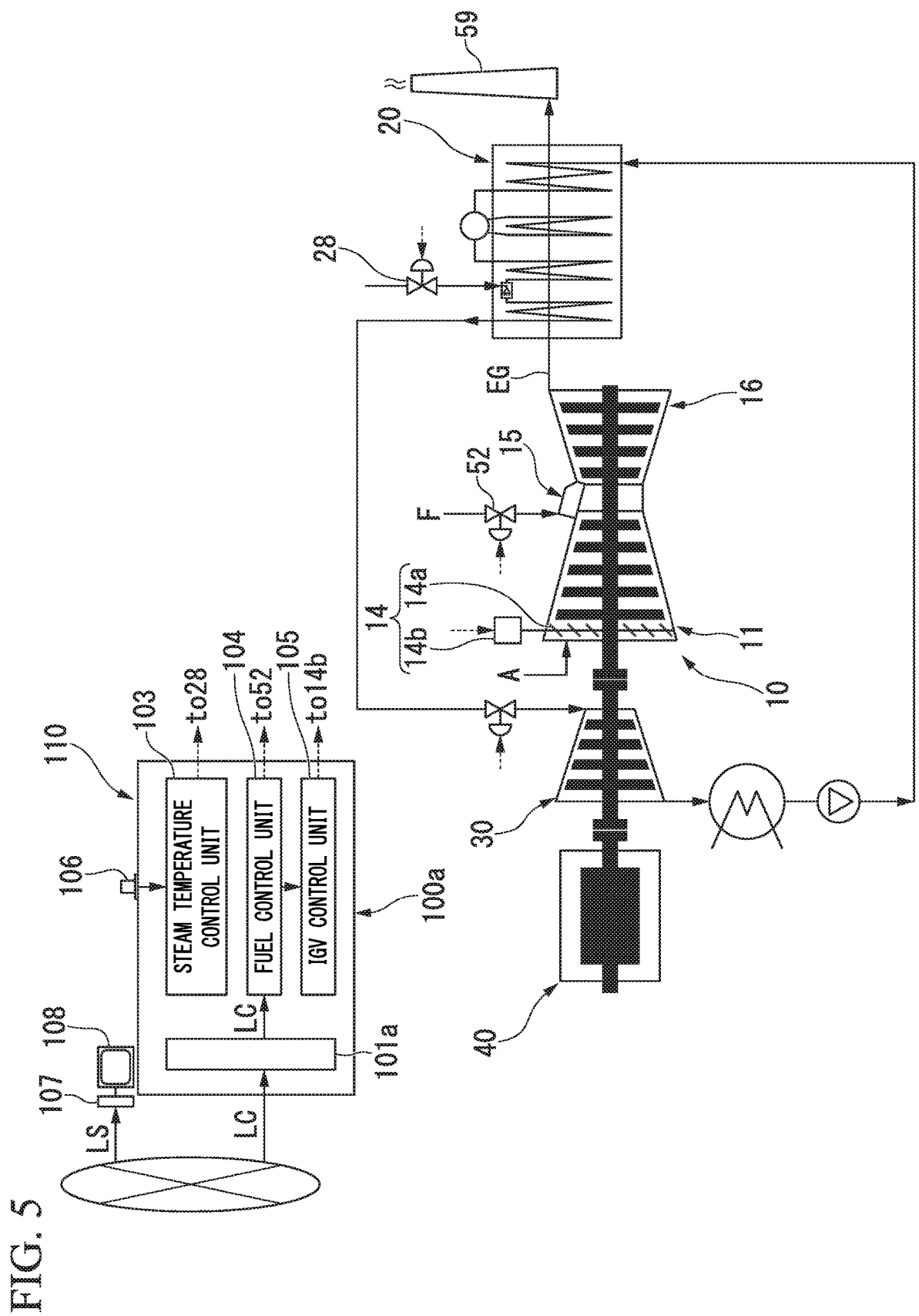
FIG. 5 is a system diagram of a combined cycle plant according to a second embodiment of the invention.

A second embodiment of the combined cycle plant according to the invention will be described below with reference to FIG. 5.

The combined cycle plant according to this embodiment is different from the combined cycle plant according to the first embodiment in only the control device. Accordingly, a control device 100a in the combined cycle plant according to this embodiment will be mainly described below.

The control device 100a according to this embodiment includes a control device body 110, a receiver device 107 that receives a load schedule LS form the outside via a communication network N, and a display device 108 that displays the load schedule LS received by the receiver device 107.

Similarly to the control device 100 according to the first embodiment, the control device body 110 includes a reception unit 101a, a steam temperature control unit 103a, a fuel control unit 104, and an IGV control unit 105. Here, the control device body 110 does not include the temperature decrease time-instructing unit 102 in the control device 100 according to the first embodiment. Instead, the control device body 110 includes an operation terminal 106 that issues an instruction indicating an amount of operation of the spray water-regulating valve 28 which is a steam temperature regulator to the steam temperature control unit 103a. Since the receiver device 107 of the control device 100a according to this embodiment receives a load schedule LS, the reception unit 101a of the control device body 110 does not receive the load schedule LS.

Figure 2:
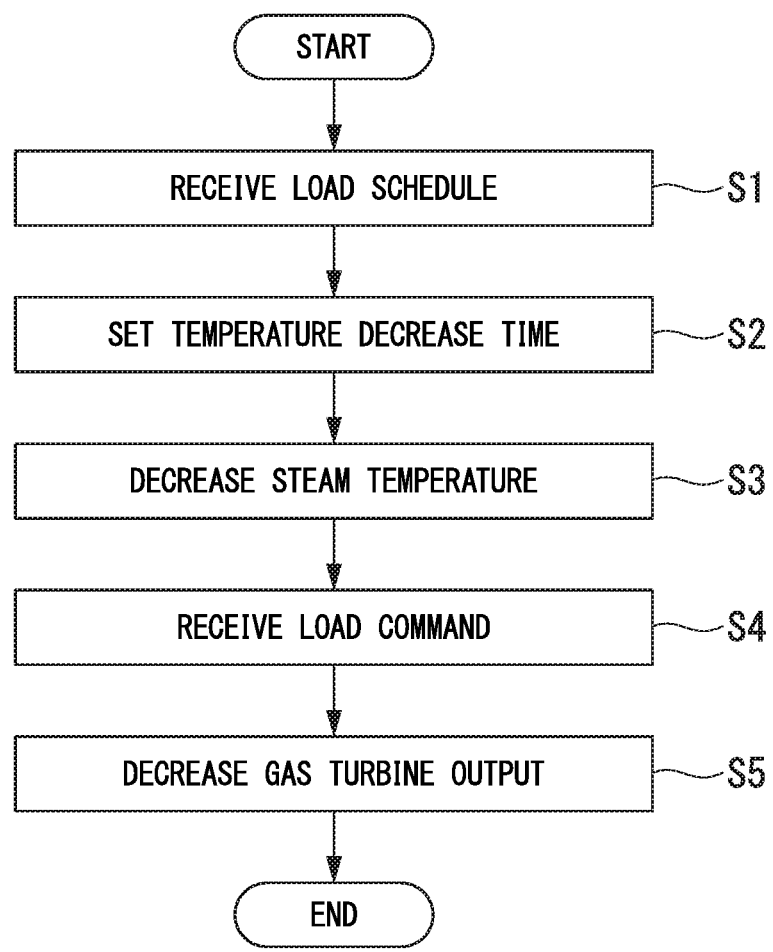
FIG. 2 is a flowchart illustrating an operation of a control device according to the first embodiment of the invention.

In this embodiment, the flowchart illustrated in FIG. 2, when the receiver device (the reception unit) 107 receives a load schedule LS from the outside (S1: a load schedule receiving step), the display device 108 displays the received load schedule LS. An operator sees the load schedule LS and recognizes a load decrease time at which a load is to be decreased. The operator sets a time prior to the load decrease time as a temperature decrease time (S2: a temperature decrease time-setting step). Thereafter, at the temperature decrease time, the operator operates the operation terminal 106 such that an instruction indicating an amount of operation (a valve opening degree) of the spray water-regulating valve 28 is issued to the steam temperature control unit 103a. The steam temperature control unit 103a outputs a valve opening degree command indicating a valve opening degree based on the instruction to the spray water-regulating valve 28. Thereafter, the operator operates the operation terminal 106 to issues an instruction indicating an amount of operation of the spray water-regulating valve 28 which is suitable at that time to the steam temperature control unit 103a. Thereafter, the control device 100a basically operates in the same way as in the first embodiment.

In the first embodiment, the temperature decrease time-instructing unit 102 of the control device 100 performs recognition of the load decrease time, setting of the temperature decrease time, and instruction to the steam temperature control unit 103. On the other hand, in this embodiment, the operator performs recognition of the load decrease time, setting of the temperature decrease time, and instruction to the steam temperature control unit 103a.

In this way, in this embodiment, a burden on an operator is larger than that in the first embodiment. However, in this embodiment, it is possible to minimize modification of a control device even when the method for reducing a minimum output according to the first embodiment is performed using an existing control device.

In this embodiment, the display device 108 serves as a device that outputs a load schedule LS. However, a printer may be provided instead of the display device 108.

Modified Examples

In the above-mentioned embodiments, water is sprayed into the second steam line 25b among lines in which steam flows. However, water may be sprayed into the main steam line 29. In this way, when water is spayed into the main steam line 29, it is possible to accurately and easily manage the temperature of main steam flowing into the steam turbine 30. In order to prevent water sprayed into the main steam line 29 from not being vaporized and flowing into the steam turbine 30, it is preferable that water be sprayed to a position in the main steam line 29 which is distant from the steam turbine 30 and close to the overheater.

The exhaust heat recovery boiler 20 in the above-mentioned embodiments includes two overheaters 23a and 23b. However, there may be only one overheater. In this case, water may be sprayed upstream in a steam flow from the overheater in the line in which steam flows, or water may be sprayed downstream as described above. The number of overheaters may be three or more. In this case, water may be sprayed between two neighboring overheaters among the three or more overheaters in the line in which steam flows, or water may be sprayed downstream from the three or more overheaters. When water is sprayed between two neighboring overheaters among the three or more overheaters, it is preferable that water be sprayed into a line connecting a furthest downstream overheater and a second furthest downstream overheater adjacent upstream to the furthest downstream overheater.

In the above-mentioned embodiments, a time t0 prior to the load decrease time t1 by the predetermined time $\Delta T$ is set as the temperature decrease time t0. However, a time prior to the load decrease time t1 by a lead time based on a decrease in load indicated by the load schedule LS may be set as the temperature decrease time t0. That is, when a decrease in load is great, a time prior to the load decrease time t1 by a longer time may be set as the temperature decrease time t0. When this is performed by the control device 100, the temperature decrease time-instructing unit 102 stores a relationship between the decrease in load and the lead time and determines the lead time based on the decrease in load indicated by the load schedule LS using this relationship.

In the above-mentioned embodiments, in the output decrease mode, a valve opening degree command indicating a predetermined fixed valve opening degree is output to the spray water-regulating valve 28 at the temperature decrease time t0. However, the valve opening level of the spray water-regulating valve 28 in the temperature decrease time t0 may not be a fixed valve opening level. The valve opening degree of the spray water-regulating valve 28 at the temperature decrease time t0 may be, for example, a valve opening degree corresponding to the temperature of main steam. In this case, the valve opening degree at that time is determined on the premise that the temperature decrease rate of the temperature of main steam is not greater than the temperature decrease rate determined in operation by spraying water into the second steam line 25b.

In the above-mentioned embodiment, the rule to change the valve opening degree of the spray water-regulating valve 28 in the output decrease mode is a rule in which the valve opening degree decreases slowly with the elapse of time from the temperature decrease time t0 and the valve opening degree becomes zero at the time t3. However, this rule may be replaced with another rule. For example, a rule in which the valve opening degree becomes zero at the load decrease time t1 or the time t2 may be employed. This rule may be a rule in which the valve opening degree decreases slowly after the initial fixed valve opening degree is maintained for a predetermined time.

In the above-mentioned embodiments, control of the valve opening degree of the spray water-regulating valve 28 in the output decrease mode, that is, control of the temperature of main steam, is so-called feedforward control. However, this control may be feedback control. In this case, a thermometer that detects the temperature of main steam is provided and the opening degree of the spray water-regulating valve 28 is controlled such that the temperature of main steam detected by the thermometer becomes a target temperature. When feedback control is performed in this way, it is preferable that a control gain be determined such that the temperature decrease rate of the temperature of main steam is not greater than the temperature decrease rate determined in operation thereof.

In the above-mentioned embodiments, the temperature of main steam is decreased by spraying liquid water into steam. However, the method of decreasing the temperature of main steam is not limited thereto. The temperature of main steam may be decreased, for example, by providing a heat exchanger that exchanges heat between steam and a cooling medium and regulating a flow rate of the cooling medium. That is, the steam temperature regulator may be constituted by a heat exchanger that exchanges heat between steam and a cooling medium and a regulation valve that regulates a flow rate of the cooling medium flowing into the heat exchanger.

INDUSTRIAL APPLICABILITY

According to an aspect of the invention, it is possible to reduce an operating minimum output when the output of a combined cycle plant is reduced.

REFERENCE SIGNS LIST

10 Gas turbine
11 Compressor
14 Intake air regulator
15 Combustor
16 Turbine
19 Gas turbine rotor
20 Exhaust heat recovery boiler
21 Coal economizer
22 Evaporator
23 Overheater
23a First overheater (second furthest downstream overheater)
23b Second overheater (furthest downstream overheater)
25a First steam line
25b Second steam line
26 Nozzle (steam temperature regulator)
27 Spray water line
28 Spray water-regulating valve (steam temperature regulator)
29 Main steam line
30 Steam turbine
34 Main steam valve
35 Condenser
36 Water feed pump
37 Water supply line
40 Power generator
51 Fuel line
52 Fuel-regulating valve
100, 100a Control device
101, 101a Reception unit
102 Temperature decrease time-instructing unit
103, 103a Steam temperature control unit
104 Fuel control unit
105 IGV control unit
107 Receiver device (reception unit)
108 Display device (output unit)
110 Control device body

The invention claimed is:

1. A method for operating a combined cycle plant including a gas turbine that is driven using combustion gas, an exhaust heat recovery boiler that generates steam using heat of exhaust gas discharged from the gas turbine, and a steam turbine that is driven using the steam, the method comprising:
a reception step of a control device receiving a load schedule indicating a load of the combined cycle plant;
a decrease time-setting step of the control device recognizing a load decrease time at which the load is to be decreased with reference to the load schedule received in the reception step and setting a time prior to the load decrease time as a temperature decrease time at which a temperature of the steam supplied to the steam turbine is to be decreased;
a temperature-decreasing step of decreasing the temperature of the steam supplied to the steam turbine at the temperature decrease time by spraying water into the steam; and
a gas turbine output-decreasing step of decreasing an amount of fuel supplied to the gas turbine at the load decrease time.

2. The method according to claim 1, wherein the decrease time-setting step includes setting a time prior to the load decrease time by a predetermined fixed time as the temperature decrease time.

3. The method according to claim 1, wherein the decrease time-setting step includes setting a time prior to the load decrease time by a time corresponding to a decrease in load indicated by the load schedule as the temperature decrease time.

4. The method according to claim 1, wherein the temperature-decreasing step includes decreasing the temperature of the steam such that a rate of change which is a change per unit time of the temperature of the steam is within a predetermined range.

5. The method according to claim 1, wherein the temperature-decreasing step includes decreasing an amount of the water sprayed.

6. The method according to claim 5, wherein the temperature-decreasing step includes decreasing the amount of the water sprayed at a constant rate.

7. A control device for a combined cycle plant including a gas turbine configured to be driven using combustion gas, a fuel regulator configured to regulate a flow rate of fuel supplied to the gas turbine, an exhaust heat recovery boiler configured to generate steam using heat of exhaust gas discharged from the gas turbine, a steam turbine configured to be driven using the steam, and a steam temperature regulator configured to regulate a temperature of the steam, the control device comprising:
a reception unit configured to receive a load schedule indicating a load of the combined cycle plant;
a steam temperature control unit configured to output a command indicating an amount of water sprayed into the steam for decreasing the temperature of the steam to the steam temperature regulator prior to a load decrease time at which the load is to be decreased in the load schedule; and
a fuel control unit configured to output a command indicating an amount of operation for reducing an amount of supplied fuel at the load decrease time to the fuel regulator.

8. The control device according to claim 7, further comprising a temperature decrease time-instructing unit configured to recognize the load decrease time received by the reception unit, set a time prior to the load decrease time as a temperature decrease time at which the temperature of the steam is to be decreased, and cause the steam temperature control unit to output the command to the steam temperature regulator at the temperature decrease time.

9. The control device according to claim 8, wherein the temperature decrease time-instructing unit is configured to store a predetermined time and set a time prior to the load decrease time by the predetermined time as the temperature decrease time.

10. The control device according to claim 8, wherein the temperature decrease time-instructing unit is configured to store a relationship between a decrease in load and a lead time, set the lead time corresponding to the decrease in load indicated by the load schedule using the relationship, and set a time prior to the load decrease time by the lead time as the temperature decrease time.

11. The control device according to claim 8, wherein the steam temperature control unit is configured to set the amount of water sprayed by the steam temperature regulator such that a rate of change which is a change per unit time of the temperature of the steam is within a predetermined range.

12. The control device according to claim 8, wherein the steam temperature control unit is configured to decrease the amount of water sprayed by the steam temperature regulator.

13. The control device according to claim 12, wherein the steam temperature control unit is configured to decrease the amount of water sprayed by the steam temperature regulator at a constant rate.

14. The control device according to claim 7, further comprising:
an output unit configured to output the load schedule received by the reception unit; and
an operation terminal configured to issue an instruction for the amount of water sprayed by the steam temperature regulator to the steam temperature control unit.

15. A combined cycle plant comprising:
the control device according to claim 7;
the gas turbine;
the fuel regulator;
the exhaust heat recovery boiler;
the steam turbine; and
the steam temperature regulator.

16. The combined cycle plant according to claim 15, further comprising a steam line in which the steam supplied to the steam turbine is configured to flow,
wherein the steam temperature regulator includes a nozzle configured to spray the water into the steam line and a spray water regulator configured to regulate a flow rate of the water supplied to the nozzle.

17. The combined cycle plant according to claim 16,
wherein the exhaust heat recovery boiler includes a plurality of overheaters configured to overheat steam,
wherein the plurality of overheaters are connected to each other via a first steam line, and
wherein the nozzle is in the first steam line or a second steam line connected to one of the plurality of overheaters which is furthest downstream in a steam flow to the steam turbine.

18. The combined cycle plant according to claim 16,
wherein the exhaust heat recovery boiler includes a plurality of overheaters configured to overheat steam, and
wherein the nozzle is in a steam line connecting a first of the plurality of overheaters which is furthest downstream in a steam flow to the steam turbine to a second of the plurality of overheaters which is next upstream from the first of the plurality of overheaters.

* * * * *